(12) United States Patent
Mey et al.

(10) Patent No.: US 6,976,455 B2
(45) Date of Patent: Dec. 20, 2005

(54) FUEL SYSTEM FOR AN LPG ENGINE

(75) Inventors: Jörn Mey, Mölin (DE); Andreas Kistner, Wächtersbach (DE); Andreas Firsching, Aschaffenburg (DE); Frank Wucherpfenning, Wolfenbüttel (DE); Joachim Seydell, Gifhorn (DE); Iraklis Avramopoulos, Berlin (DE)

(73) Assignees: Linde Aktiengesellschaft, (DE); Volkswagen AG, (DE)

( * ) Notice: Subject to any disclaimer, the term of this patent is extended or adjusted under 35 U.S.C. 154(b) by 0 days.

(21) Appl. No.: 10/703,199

(22) Filed: Nov. 6, 2003

(65) Prior Publication Data

US 2004/0144370 A1    Jul. 29, 2004

(30) Foreign Application Priority Data

Nov. 8, 2002   (DE) ............................... 102 52 084

(51) Int. Cl.⁷ ............................................. F02B 43/08
(52) U.S. Cl. ........................................ 123/3; 123/549
(58) Field of Search ............................ 123/3, 527, 525, 123/549, 543, 545; 60/285, 274, 279, 286, 60/295, 303

(56) References Cited

U.S. PATENT DOCUMENTS

| | | | | |
|---|---|---|---|---|
| 4,429,534 A | * | 2/1984 | Joy | 60/618 |
| 4,488,517 A | * | 12/1984 | Yoon | 123/3 |
| 4,520,764 A | * | 6/1985 | Ozawa et al. | 123/3 |
| 6,311,650 B1 | * | 11/2001 | Lamm | 123/3 |
| 6,655,130 B1 | * | 12/2003 | Kirwan et al. | 60/284 |
| 6,698,190 B2 | * | 3/2004 | Docter et al. | 60/285 |
| 6,702,991 B1 | * | 3/2004 | Smaling et al. | 422/186.2 |
| 6,715,452 B1 | * | 4/2004 | Taylor et al. | 123/3 |
| 6,810,658 B2 | * | 11/2004 | Kaupert et al. | 60/274 |

* cited by examiner

Primary Examiner—Noah P. Kamen
Assistant Examiner—Jason Benton
(74) Attorney, Agent, or Firm—The Webb Law Firm

(57) ABSTRACT

A fuel system for an internal combustion engine (12) operated with fuel gas includes an evaporator (1) in which the liquid fuel gas is transformed by the addition of heat into a gaseous state. The evaporator (1) has a first heating device (13) configured to transmit a portion of the waste heat of the internal combustion engine (12) to the fuel gas in the evaporator (1). The evaporator (1) has a second heating device, by means of which the fuel gas in the evaporator (1) can be heated regardless of the condition of the internal combustion engine (12). The second heating device (14) can include an electrical heating element, e.g., a PTC heating element.

19 Claims, 1 Drawing Sheet

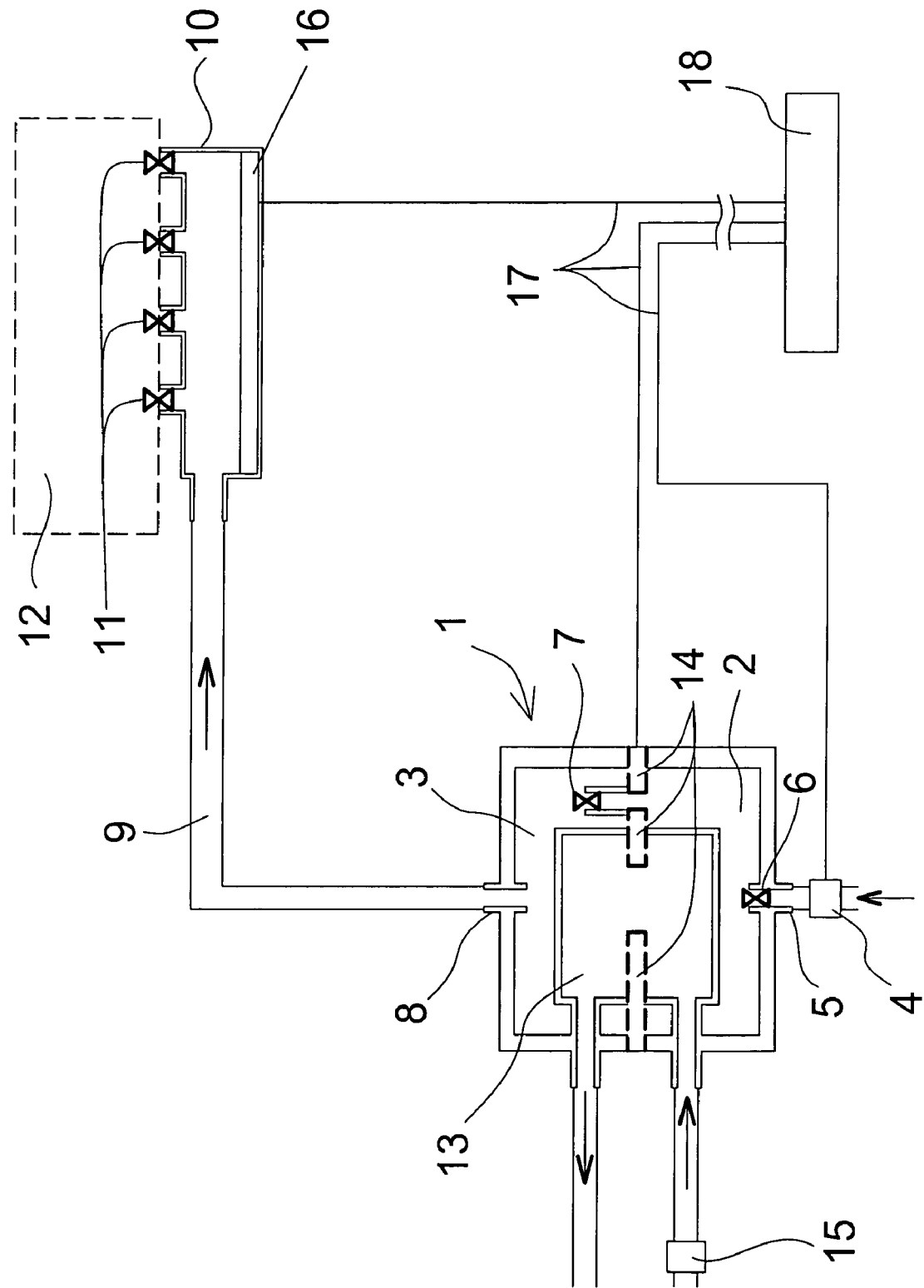

FUEL SYSTEM FOR AN LPG ENGINE

CROSS REFERENCE TO RELATED APPLICATION

This application corresponds to German Application No. 102 52 084.4 filed Nov. 8, 2002, which is herein incorporated by reference in its entirety.

BACKGROUND OF THE INVENTION

1. Field of the Invention

This invention relates to a fuel system for an internal combustion engine operated with fuel gas. The fuel system has an evaporator in which the fuel, which is stored in the liquid state, is transformed by the application of heat into a gaseous state. The evaporator has a first heating device for the fuel gas, by means of which a portion of the waste heat of the internal combustion engine can be transmitted to the fuel gas that is in the evaporator.

2. Technical Considerations

Internal combustion engines powered by fuel gas are frequently used in industrial trucks, such as fork-lift trucks, as well as in passenger vehicles. The fuel gas most commonly used for this application is conventionally termed "LPG" (liquid petroleum gas) and consists primarily of propane and/or butane.

The fuel system of a conventional internal combustion engine typically has an evaporator in which the fuel gas, which is stored in the liquid state, is transformed into a gaseous state by applying thermal energy to the fuel gas. This addition of thermal energy generally takes place using the heat from the coolant of the internal combustion engine, which can be used to heat a housing of the evaporator. The evaporator thereby also acts as a pressure regulator so that the fuel gas is available at the output of the evaporator in a gaseous state and at a defined pressure. An additional component of the fuel system, located downstream of the evaporator, is either a mixer, the function of which corresponds to a carburetor in a gasoline-powered engine, or an injection system.

For safety reasons, it is important that under all operating conditions only gaseous fuel gas is in the parts of the fuel system that are located downstream of the evaporator. One particularly hazardous operating condition is the starting of an internal combustion engine in a cold environment when the coolant fluid of the internal combustion engine has not yet been heated. Under such operating conditions, the accumulation of liquid fuel gas in the injection system and in the lines leading to it initially leads to an over-enriched air-fuel mixture in the internal combustion engine, which, therefore, does not start. Consequently, additional liquid fuel gas accumulates behind the evaporator, which ultimately causes a significant safety problem.

Therefore, it is an object of the invention to provide a fuel system for a fuel gas engine which safely prevents an accumulation of liquid fuel gas behind the evaporator.

SUMMARY OF THE INVENTION

The invention provides a fuel system in which the evaporator has a second heating device with which the fuel gas in the evaporator can be heated independently of the condition of the internal combustion engine. The second heating device ensures, regardless of the ambient temperature and, therefore, likewise regardless of the temperature of the liquid fuel gas, that even when the internal combustion engine is cold, all of the fuel gas that flows through the evaporator is transformed into the gas phase.

The second heating device can have an electrical heating element. The electrical heating element can be supplied with electric current by the starter battery of the internal combustion engine.

It is particularly advantageous if the electrical heating element of the second heating device is a "PTC" (Positive Temperature Coefficient) heating element. Conventional PTC heating elements have an internal electrical resistance which also increases with increasing temperature so that the heating output of the PTC heating element decreases as the temperature increases. The desired temperature setpoint can, therefore, be defined by an appropriate selection of the PTC heating element so that there is no need for a separate regulating device for the heating device.

In one construction of the evaporator, the evaporator has first and second evaporation chambers which are connected to each other by a valve. The fuel gas is thereby evaporated in the two evaporator chambers in two stages.

In one particularly advantageous configuration of the invention, the first heating device is located inside the evaporator. In this case, for example, a heat exchanger through which the engine coolant flows can be located inside a housing of the evaporator.

The first heating device can be located so that the fuel gas in the first evaporator chamber and the fuel gas in the second evaporator chamber can be heated by means of the first heating device.

The second heating device can also be located inside the evaporator. The housing of the second heating device can also be located inside the housing of the evaporator.

The second heating device can also be located so that the fuel gas in the first evaporator chamber and the fuel gas in the second evaporator chamber can be heated by means of the second heating device.

The second heating device can be located so that a liquid medium in the first heating device can be heated by means of the second heating device. The heating of the fuel gas in the evaporator chambers by the second heating device thus takes place both directly and indirectly by means of the liquid medium and the housing of the first heating device.

In one particular embodiment, there is no need to have a separate partition because the second heating device defines a partition between the first evaporator chamber and the second evaporator chamber. The second heating device thereby can have a flat shape and can be sealed with respect to the adjacent parts of the evaporator housing.

In the vicinity of an input of the evaporator, through which the fuel gas in the liquid state enters the evaporator, there can be a shutoff valve which can be actuated magnetically. The shutoff valve can be switched by a control system and can be used to prevent the undesired entry of fuel gas into the evaporator.

An output of the evaporator, through which the fuel gas in the gaseous state exits the evaporator, can be in communication with a common-rail injection line located on the internal combustion engine. A conventional common-rail injection line of this type, which is also frequently called a "rail", can be oriented parallel to and at a slight distance from the cylinder head of the internal combustion engine. Similar fuel injection systems are used in the automobile industry, in particular for diesel engines.

The re-condensation of the fuel gas in the common rail can be safely and reliably prevented by providing a third heating device located on the common rail. The third heating device heats the walls of the common rail and prevents the condensation of the fuel gas, even when the internal combustion engine is cold and when the ambient temperature is low.

The third heating device also can have an electrical heating element and can, therefore, be operated independently of the status of the internal combustion engine. For example, the third heating device can be connected to the electrical system of the industrial truck.

The electrical heating element of the third heating device can also be a PTC heating element, with the advantages described above.

BRIEF DESCRIPTION OF THE DRAWING

Additional advantages and details of the invention are explained in greater detail below with reference to the exemplary embodiment illustrated in the accompanying drawing.

DESCRIPTION OF THE PREFERRED EMBODIMENT

The FIGURE shows an exemplary fuel system incorporating features of the invention for an internal combustion engine powered by liquid petroleum gas (LPG). An evaporator 1 has a first evaporator chamber 2 and a second evaporator chamber 3. A pressure vessel (not shown) for the fuel gas is connected by means of a shutoff valve 4 to an input 5 of the evaporator 1. In the vicinity of the input 5, there is a first valve 6 at which the liquid fuel gas is depressurized and thereby is at least partly transformed into the gas phase. By means of a second valve 7, the fuel gas travels into the second evaporator chamber 3, where it is transformed in its entirety into the gas phase. An output 8 located on the second evaporator chamber 3 connects the evaporator 1 via a line 9 with a common rail 10. Located on the common rail 10 are valves 11, by means of which the fuel gas is injected directly or indirectly via an air intake channel into the combustion chambers of an internal combustion engine 12.

During the evaporation, the fuel gas absorbs thermal energy from its environment, which is transmitted to the evaporator 1 by means of a first heating device 13 and a second heating device 14. The first heating device 13 is coupled to a cooling circuit of the internal combustion engine 12. The heat exchanger of the first heating device 13 located inside the evaporator 1 extends to both evaporator chambers 2, 3 and coolant of the internal combustion engine 12 flows through the first heating device 13. An optional thermostatic valve 15 regulates the coolant flow as a function of the temperature of the coolant so that coolant flows through the first heating device 13 only when its temperature exceeds a certain limit. The second heating device 14 is heated with electrical energy and can, therefore, be operated regardless of the condition of the internal combustion engine 12. For example, the second heating device 14 can be supplied with electric current by the starter battery of the internal combustion engine. The second heating device 14 can be located so that it forms the partition between the first evaporator chamber 2 and the second evaporator chamber 3, and can also extend to the interior of the heat exchanger of the first heating device 13 so that thermal energy can be transmitted from the second heating device 14 directly and/or indirectly via the first heating device 13 to the fuel gas located in the evaporator chambers 2, 3. Heat from the second heating device 14 can be generated by a conventional PTC heating element, the temperature of which can be automatically regulated to a preset value. A third heating device 16 can be used to heat the common rail 10 and can also be equipped with a conventional PTC heating element.

The second, electrically operated heating device 14 ensures that the fuel gas is mostly, e.g., completely, evaporated in the evaporator 1 even when the ambient temperature is low or when the internal combustion engine 12 is cold. It thereby becomes possible to safely and reliably prevent hazardous operating conditions that result when liquid fuel gas gets into the line 9 and into the common rail 10. The optional third heating device 16 can prevent a re-condensation of the gaseous fuel gas on the potentially cold walls of the common rail 10.

To guarantee the operational safety of the internal combustion engine 12 at all times, the correct operation of the shutoff valve 4 and of the second and third heating devices 14, 16 can be continuously monitored by an electronic monitoring unit 18 by means of communications lines 17.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A fuel system for an internal combustion engine operated with fuel gas, comprising:
   an evaporator in which fuel gas stored in a liquid state is transformed by the application of heat into a gaseous state, the evaporator comprising:
   a first heating device for the fuel gas, the first heating device configured to transmit a portion of the waste heat of an internal combustion engine to the fuel gas in the evaporator; and
   a second heating device by means of which the fuel gas in the evaporator can be heated regardless of the condition of the internal combustion engine, wherein the second heating device partitions the evaporator into a first evaporator chamber and a second evaporator chamber.

2. The fuel system as claimed in claim 1, wherein the second heating device includes an electrical heating element.

3. The fuel system as claimed in claim 2, wherein the electrical heating element of the second heating device is a PTC heating element.

4. The fuel system as claimed in claim 1, wherein the first evaporator chamber and second evaporator chamber are connected to each other by a valve.

5. The fuel system as claimed in claim 1, wherein the first heating device is located inside the evaporator.

6. The fuel system as claimed in claim 4, wherein the first heating device is located so that the fuel gas in the first evaporator chamber and the fuel gas in the second evaporator chamber are heated by the first heating device.

7. The fuel system as claimed in claim 1, wherein the second heating device is located inside the evaporator.

8. The fuel system as claimed in claim 4, wherein the second heating device is located so that the fuel gas in the first evaporator chamber and the fuel gas in the second evaporator chamber are heated by the second heating device.

9. The fuel system as claimed in claim 1, wherein the second heating device is located so that a liquid medium located in the first heating device is heated by the second heating device.

10. A fuel system for an internal combustion engine operated with fuel gas, comprising:
an evaporator in which fuel gas stored in a liquid state is transformed by the application of heat into a gaseous state, the evaporator comprising:
a first heating device for the fuel gas, the first heating device configured to transmit a portion of the waste heat of an internal combustion engine to the fuel gas in the evaporator; and
a second heating device by means of which the fuel gas in the evaporator can be heated regardless of the condition of the internal combustion engine,
wherein the evaporator includes a first evaporator chamber and a second evaporator chamber connected to each other by a valve, and
wherein the second heating device forms a partition between the first evaporator chamber and the second evaporator chamber.

11. The fuel system as claimed in claim 1, including an evaporator inlet and a magnetically actuated shutoff valve positioned in the vicinity of the evaporator inlet through which the fuel gas enters the evaporator in the liquid state.

12. The fuel system as claimed in claim 1, including an evaporator outlet through which the fuel gas in the gaseous state exits the evaporator, wherein the outlet is connected with a common rail located on the internal combustion engine.

13. A fuel system for an internal combustion engine operated with fuel gas, comprising:
a common rail located on an internal combustion engine;
an evaporator in which fuel gas stored in a liquid state is transformed by the application of heat into a gaseous state, the evaporator comprising:
a first heating device for the fuel gas, the first heating device configured to transmit a portion of the waste heat of an internal combustion engine to the fuel gas in the evaporator;
a second heating device by means of which the fuel gas in the evaporator can be heated regardless of the condition of the internal combustion engine; and
an evaporator outlet through which the fuel gas in the gaseous state exits the evaporator, wherein the outlet is connected with the common rail located on the internal combustion engine; and
a third heating device located on the common rail.

14. The fuel system as claimed in claim 13, wherein the third heating device includes an electrical heating element.

15. The fuel system as claimed in claim 14, wherein the electrical heating element of the third heating device is a PTC heating element.

16. A fuel system, comprising:
an internal combustion engine;
a source of liquid fuel gas; and
an evaporator in flow communication with the liquid fuel gas, the evaporator comprising:
a first chamber and a second chamber;
a first heating element configured to transmit waste heat from the internal combustion engine into at least one of the first and second evaporator chambers; and
a second heating device configured to provide heat to at least one of the first and second evaporator chambers, the second heating device comprising an electrical heating element,
wherein the second heating device forms a partition between the first and second evaporator chambers.

17. The fuel system as claimed in claim 16, wherein the first and second heating devices are located inside the evaporator.

18. A fuel system, comprising:
an internal combustion engine;
a source of liquid fuel gas; and
an evaporator in flow communication with the liquid fuel gas, the evaporator comprising:
a first chamber and a second chamber;
a first heating chamber element configured to transmit waste heat from the internal combustion engine into at least one of the first and second evaporator chambers; and
a second heating device configured to provide heat to at least one of the first and second evaporator chambers, the second heating device comprising an electrical heating element,
wherein the fuel system further includes a common rail connected to the evaporator and a third heating device configured to transmit heat to the common rail.

19. The fuel system as claimed in claim 18, wherein the third heating device includes an electrical heating element.

* * * * *

UNITED STATES PATENT AND TRADEMARK OFFICE
CERTIFICATE OF CORRECTION

PATENT NO. : 6,976,455 B2  Page 1 of 1
DATED : December 20, 2005
INVENTOR(S) : Mey et al.

It is certified that error appears in the above-identified patent and that said Letters Patent is hereby corrected as shown below:

Column 6,
Line 31, "a first heating chamber element" should read -- a first heating element --.

Signed and Sealed this

Sixth Day of June, 2006

JON W. DUDAS
*Director of the United States Patent and Trademark Office*